Figure 5:
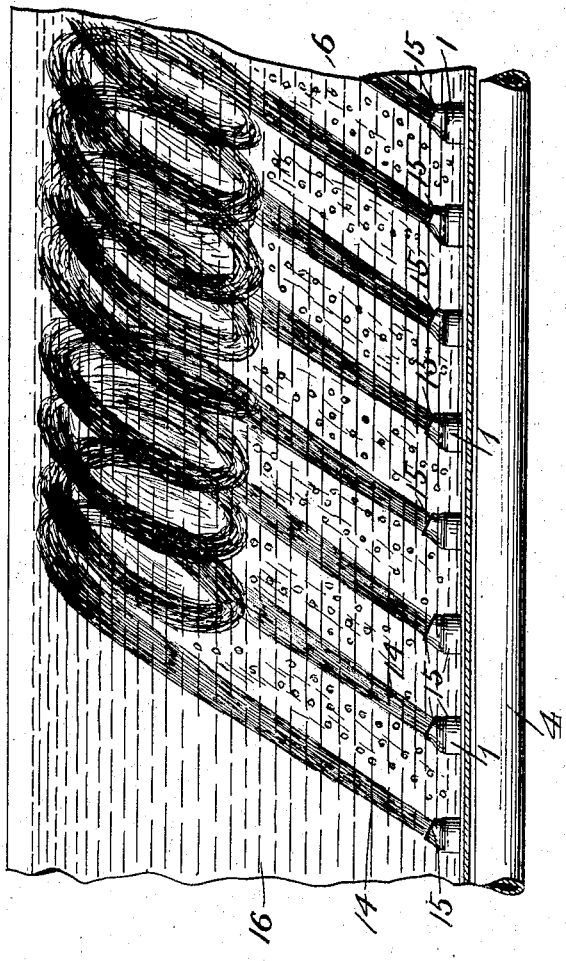

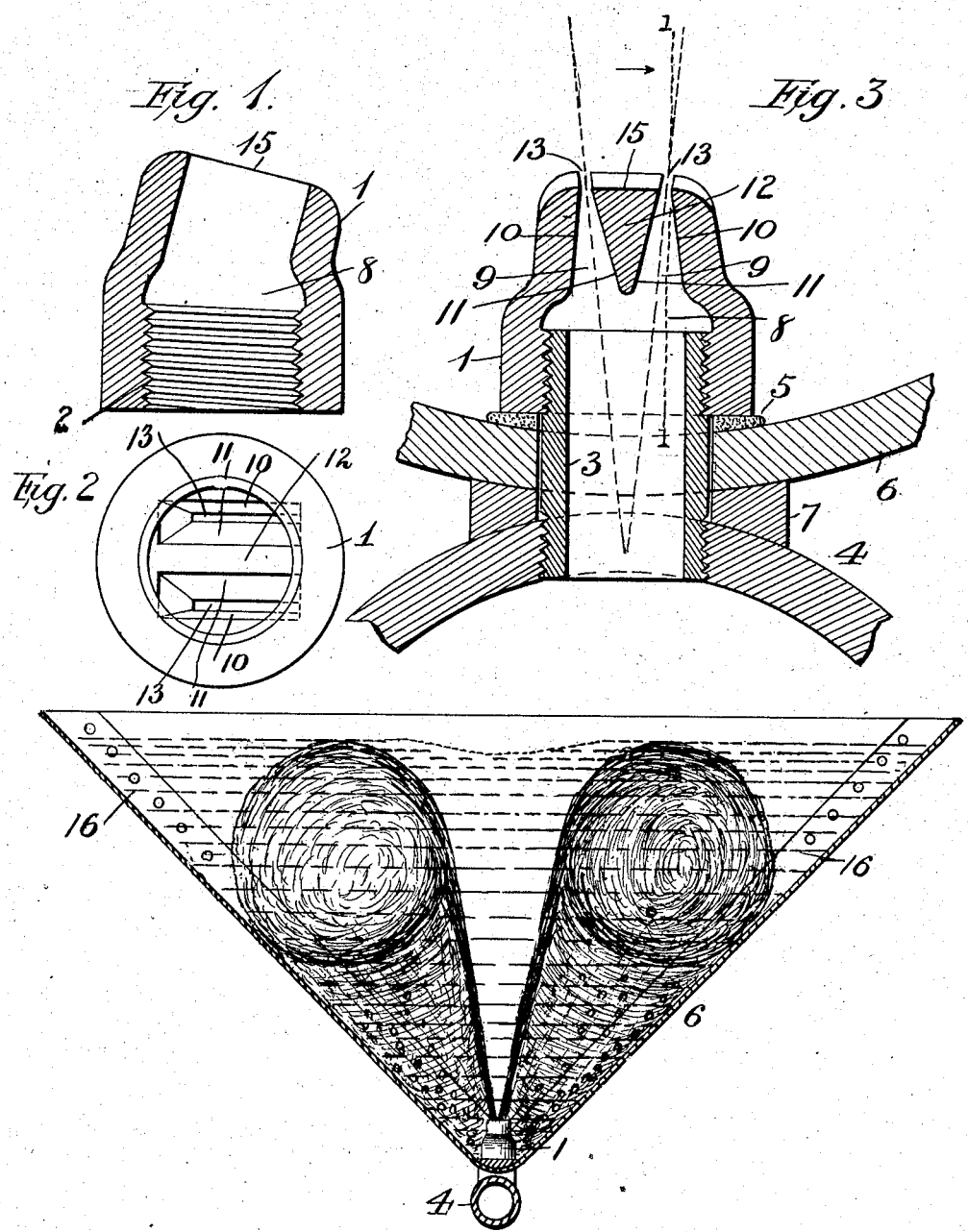

No. 791,387. PATENTED MAY 30, 1905.
J. L. WEAVER.
JET NOZZLE FOR WET CONCENTRATORS.
APPLICATION FILED JAN. 21, 1905.

2 SHEETS—SHEET 2.

Witnesses
Franck L. Ourand
W. Parker Reinohl

Inventor
John L. Weaver.
By D. C. Reinohl.
Attorney

No. 791,387.

Patented May 30, 1905.

UNITED STATES PATENT OFFICE.

JOHN L. WEAVER, OF BOISE, IDAHO.

JET-NOZZLE FOR WET CONCENTRATORS.

SPECIFICATION forming part of Letters Patent No. 791,387, dated May 30, 1905.

Application filed January 21, 1905. Serial No. 242,135.

*To all whom it may concern:*

Be it known that I, JOHN L. WEAVER, a citizen of the United States, residing at Boise, in the county of Ada and State of Idaho, have invented certain new and useful Improvements in Jet-Nozzles for Wet Cencentrators; and I do hereby declare the following to be a full, clear, and exact description of the invention, such as will enable others skilled in the art to which it appertains to make and use the same.

My invention relates to nozzles which as heretofore constructed discharge water in cylindrical bodies or jets, which soon after leaving the nozzle spread or dissipate into spray, and thereby lose their propulsive force. It is my purpose to retain the stream of water in the compact body in which it issues from the nozzle as long as possible and to utilize its propulsive power to produce a rolling gyratory wave-like motion of the water freighted with solids in a tank or receptacle; to agitate the solids and effect a thorough washing thereof for the separation therefrom or recovery of valuable products, such as precious metals and the like. The nozzle is not, however, limited in its use, but may be applied for other purposes where mechanical agitation is now required to effect washing.

The invention consists in certain improvements in construction, which will be fully disclosed in the following specification and claims.

In the accompanying drawings, which form part of this specification, Figure 1 represents a vertical section of the nozzle detached and on line 1 1, Fig. 3; Fig. 2, an inverted plan view of the same; Fig. 3, a vertical transverse section of part of a tank, part of a supply-pipe, a nozzle, and its connecting-nipple; Fig. 4, a vertical transverse section of a tank and the supply-pipe and a nozzle in elevation; and Fig. 5, a vertical longitudinal section of a tank, the supply-pipe and the nozzles being shown in side elevation.

Reference being had to the drawings and the designating characters thereon, the numeral 1 indicates the nozzle, which is internally screw-threaded at its inner end 2 for connecting with a nipple 3, by which the nozzle is secured to a supply-pipe 4, as shown in Fig. 3, there being a composition packing 5 interposed between the end of the nozzle and the tank 6 and an annular washer 7 between the outer surfaces of the tank and the supply-pipe. The nozzle is provided with a chamber 8, from which the water is conducted through tapering or contracting passages 9 on opposite sides of the center of the nozzle, the passages being formed by the inclined walls 10 and the walls 11 formed on the core 12, and said walls 11 are provided with a more acute angle than the walls 10 to direct the sheet of water discharged from the elongated openings 13 in the end of the nozzle in diverging streams 14, which maintain their form as they travel upward and forward in the tank and impart a rolling gyratory wave-like motion to the water in the tank 6, into which the streams are discharged. The openings 13 are provided with parallel opposite longitudinal edges and have been made one inch long and one-sixteenth of an inch wide and the nozzles placed six inches apart in the same vertical plane on the supply-pipe applied to a tank.

The outer end 15 of the nozzle is inclined, as shown, which projects the streams of water forward at an angle, so that the streams issuing from one nozzle extend to and are met by the streams of the fourth nozzle in advance before the former streams have separated or become dissipated and lost their propulsive force, and their rolling gyratory wave-like motion is augmented by the succeeding streams issuing from the several nozzles on the supply-pipe. The whole mass of water and solids in the tank assumes the form of two oppositely-rolling cylindrical and advancing bodies of water and solids, separated and assuming a slightly trough-like form on its surface in the transverse center of the tank. This agitation of the water and the solids contained in the tank causes the solids to be thrown outward against the walls 16 of the tank by centrifugal force.

In the application of the nozzles to recover precious metals the water is supplied at from sixty to eighty pounds pressure, the metals are collected on amalgamated plates or other preferred means on the sides of the tank, (not shown, as they are well known in the art,)

while for other purposes the washing of the material is effected by the agitation and contact with the walls, and the materials may be collected from the surface of the water at one end of the tank or from the bottom after precipitation.

It has been demonstrated in the practical application of my invention that the contents of the tank assume a cylindrical form on each side of the transverse center of the tank, and in their revolution in opposite directions the fine particles of precious metals are thrown off by centrifugal force and brought in contact with the amalgamated plates on the sides of the tank and are thereby collected or recovered.

Having thus fully described my invention, what I claim is—

1. As an article of manufacture, a jet-nozzle for wet concentrators provided with parallel elongated discharge-openings, and contracting passages leading to said openings, formed by converging walls inclined from the perpendicular and constructed to discharge water in sheets diverging from the nozzle.

2. As an article of manufacture, a jet-nozzle for wet concentrators provided with parallel elongated discharge-openings, and contracting passages leading thereto, formed by converging walls inclined from the perpendicular and the inner wall of each passage having a greater angle than the outer wall, whereby water is discharged in sheets diverging from the nozzle.

3. As an article of manufacture, a jet-nozzle for wet concentrators provided with parallel elongated discharge-openings, contracting passages leading to the openings, and formed by inwardly-inclined outer walls and inner walls inclined outwardly at a greater angle than said outer walls, whereby water is discharged in sheets diverging from the nozzle.

4. As an article of manufacture, a jet-nozzle for wet concentrators having a forwardly-inclined discharge end, and parallel elongated openings therein, contracting passages leading to said openings, and formed by oppositely-inclined walls, the inner walls of each passage inclined outwardly at a greater angle than the outer walls, whereby water is discharged in sheets diverging from the nozzle and projected at an angle to the vertical plane of the nozzle.

5. A tank having oppositely-inclined walls or sides, a supply-pipe at the bottom thereof provided with a plurality of compound nozzles arranged in the same vertical plane, and provided with inclined discharge ends and parallel elongated openings therein contracting passages leading to said openings, and formed by oppositely-inclined walls, the inner wall of each passage inclined outwardly at a greater angle than the outer wall.

In testimony whereof I affix my signature in presence of two witnesses.

JOHN L. WEAVER.

Witnesses:
D. C. REINOHL,
W. PARKER REINOHL.